United States Patent

Silvanus et al.

[11] Patent Number: 6,082,073
[45] Date of Patent: Jul. 4, 2000

[54] PROFILE FOR A TRUCK FLOOR

[75] Inventors: Jürgen Silvanus, München; Achim Schoberth, Taufkirchen, both of Germany

[73] Assignee: Daimler-Benz Aktiengesellschaft, Stittgart, Germany

[21] Appl. No.: 09/150,247

[22] Filed: Sep. 10, 1998

[30] Foreign Application Priority Data

Sep. 10, 1997 [DE] Germany .......................... 197 39 595

[51] Int. Cl.[7] .............................. E04C 3/02; B60R 13/01
[52] U.S. Cl. ......................... 52/731.6; 52/181; 52/729.1; 52/735.1; 52/737.4; 29/897.2; 29/897.35; 296/184
[58] Field of Search ................................ 52/729.1, 729.2, 52/731.6, 735.1, 737.4, 177, 181; 29/897.2, 897.35; 296/184, 39.2; 105/422, 423, 375; 428/598

[56] References Cited

U.S. PATENT DOCUMENTS

| | | | |
|---|---|---|---|
| H1318 | 6/1994 | Rozenboom et al. | 296/39.2 |
| 183,160 | 10/1876 | Haughian | 52/729.2 X |
| 2,049,778 | 8/1936 | Mowery | 52/181 X |
| 3,363,933 | 1/1968 | Wilson | 296/184 |
| 3,480,321 | 11/1969 | Brandt et al. | 296/184 |
| 3,487,518 | 1/1970 | Hopfeld | 29/897.35 |
| 3,623,203 | 11/1971 | Henshaw et al. | 29/897.35 |
| 3,624,344 | 11/1971 | Kutzer | 52/506.05 X |
| 4,018,944 | 4/1977 | Hallstrom et al. | 52/181 X |
| 4,177,306 | 12/1979 | Schulz et al. | 52/729.1 X |
| 4,752,098 | 6/1988 | Shock | 296/184 |
| 5,475,951 | 12/1995 | Litzow | 52/181 X |
| 5,507,258 | 4/1996 | Sasaki | 29/888.046 X |
| 5,803,531 | 9/1998 | Nielsen | 296/184 |

FOREIGN PATENT DOCUMENTS

| | | | |
|---|---|---|---|
| 1509061 | 2/1969 | Germany | 52/729.1 |
| 23 34 645 | 1/1975 | Germany . | |
| 44 23 642 | 10/1995 | Germany . | |
| 44 28 088 | 2/1996 | Germany . | |

*Primary Examiner*—Laura A. Callo
*Attorney, Agent, or Firm*—Hill & Simpson

[57] ABSTRACT

The present invention is directed to a profile for a truck floor, particularly for a bridge or troughed floor, that comprises at least one web with a lateral surface facing toward the load, whereby at least a region of the profile adjoining the lateral surface is particle-reinforced, and is also directed to a dumpster floor formed therefrom.

19 Claims, 1 Drawing Sheet

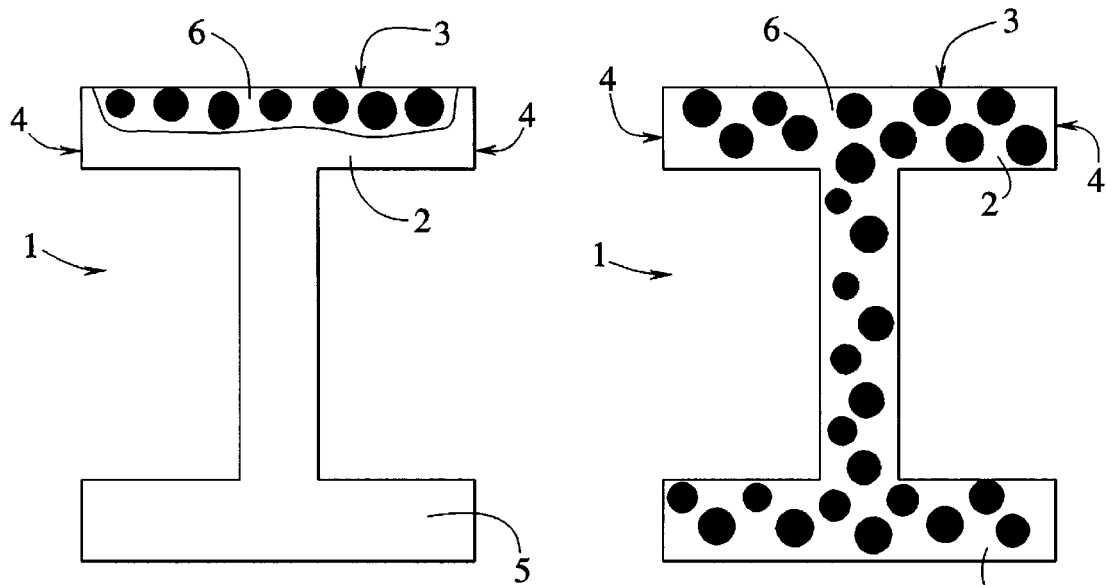
FIG. 1   FIG. 2
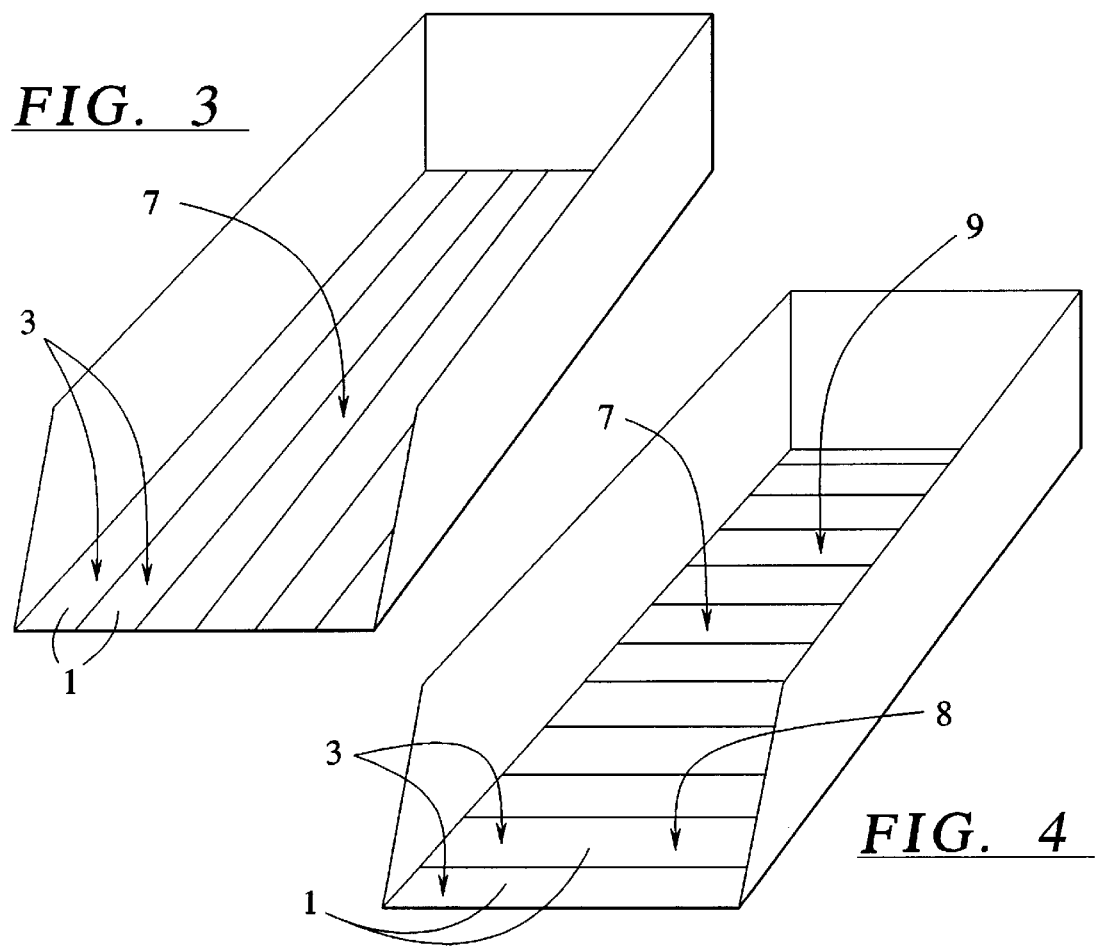
FIG. 3
FIG. 4

PROFILE FOR A TRUCK FLOOR

BACKGROUND OF THE INVENTION

1. Field of the Invention

The present invention is directed to a profile for a truck floor or bed. Specifically, this invention is directed to a structure for a dumpster truck bridge or troughed floor that comprises a least one web with a lateral surface facing toward the load.

2. Description of the Related Art

The structures of dumpster floors set forth below are described in "Aluminium-Konstruktionen des Nutzfahrzeugbaus" by Angehrn, Gross and Kowius, Aluminium-Verlag Düsseldorf, 1990, pp. 167–192.

When transporting bulk material in vehicles with (light metal) dumpsters, an abrasive wear of the dumpster floor that is typically greatest at the back part thereof occurs due to frequent loading and unloading events. In a known dumpster floor, the load surface is formed of sheets of, for example, AlMgMn that are secured to carrying profiles. When wear occurs at the sheets, the load surface is repaired by welding on new sheets. This structure has the disadvantage of long assembly times due to the required welding jobs. Moreover, the mechanical roadability of the sheets is comparatively low.

In another structure, profiles are employed for forming the dumpster floor. The profiles are manufactured or cut to the desired length according to the dimensions of the dumpster floor and are arranged with their long sides next to one another for forming the dumpster floor. Neighboring profiles are respectively connected to one another by welding or other suitable joining processes. Compared to the sheet structure, the profile structure has the advantage of a more simple manufacturing process, a shortening of the assembly times due to the lower welding requirements as well as of a higher mechanical loadability.

For costs reasons, profiles having a greater wall thickness are preferably utilized only in the back region of the dumpster floor where the abrasive wear occurs most significantly. This, however, has the disadvantage of a requisite transverse positioning of the profiles in the formation of the dumpster floor, which requires a greater number of parts connected with a higher assembly outlay compared to their longitudinal positioning. Moreover, the manufacture of profiles with different wall thicknesses results in increased tool and manufacturing costs.

One object of the present invention is the creation of a profile for a dumpster floor of the species initially cited that exhibits an improved durability with respect to abrasive wear. Moreover, a dumpster floor with improved wear resistance should be created that is formed of profiles that can be optimally economically manufactured and laid. Other objects and advantages will become apparent from the following summary and detailed description of the preferred embodiments.

SUMMARY OF THE INVENTION

The present invention is characterized in that at least one region of the profile adjoining the lateral surface is reinforced with ceramic particles. One advantage of the inventive profile is comprised in that, due to the lower abrasive where thereof, profiles having a thicker wall thickness need not be employed in the back region of the dumpster floor. The required transverse positioning of the profiles and the necessity of utilizing different tools in the manufacture thereof are thus eliminated. Moreover, material can be saved since the profiles can comprise a lower wall thickness overall.

In a preferred embodiment, the profile is essentially comprised of a light metal that, most preferably, is aluminum or, respectively, an aluminum alloy such as, for example, AlMgSi 0.7. The particles are preferably composed of ceramic such as, for example, $Al_2O_3$ or SiC.

In the welded joining of neighboring profiles, it is advantageous that the region adjoining the opposite end faces or, respectively, lateral faces of the web that generally proceed transversely or, potentially, obliquely as well relative to the lateral face is not particle-reinforced, so that a stable welding process or the like is assured in the joining of the profiles to form a floor.

Preferably, a maximum of 15% of the cross-sectional area of the profile is particle-reinforced in order to achieve utilization of materials that can be matched to the respective application but that is as economical as possible. As viewed from this aspect, it is desirable that the profile be formed or, respectively, manufactured by co-extrusion of a light metal wrought alloy and a layer forming the particle-reinforced region. Alternatively, a layer forming the particle-reinforced region can also be applied onto the non-particle-reinforced (initial profile) by thermal spraying.

In a further advantageous embodiment, the profile is completely particle-reinforced, whereby the profile is expediently composed of a homogeneous, particle-reinforced material with a matrix of light metal. In this case, the profile is preferably manufactured or, respectively, formed by extrusion.

It is desirable that the profile is an open profile such as, for example, an H, T or U profile, whereby, given, for example, an H-shaped profile, the web that comprises the lateral surface facing toward the load is one of the two webs that proceed transversely relative to a connecting web, lie opposite and generally have the same length. Alternatively, it can be advantageous to form a closed profile such as, for example, a rectangular profile, whereby a flat material embracing only one web can also be utilized.

The solution of the object directed to the dumpster floor is inventively characterized in that the load surface of the dumpster floor is formed by the lateral surfaces and at least one region of the profiles adjoining the lateral surfaces is reinforced with particles of ceramic.

The profiles are preferably arranged parallel to the longitudinal direction of the floor, which is generally understood to be the direction proceeding in the direction of travel wherein the dumpster floor comprises its greatest dimension. Compared to a transverse laying of the profiles, this has the advantage of reducing the number of profiles and, connected therewith, a reduction of the assembly requirements. Given a transverse laying, by contrast, it is advantageous that the at least partially particle-reinforced profiles only form the back region of the load surface and the remaining region is formed by more economical, non-reinforced profiles.

BRIEF DESCRIPTION OF THE DRAWINGS

The invention is described in greater detail below on the basis of exemplary embodiments with reference to the drawings wherein:

FIG. 1 illustrates a crossectional view of an exemplary embodiment of the inventive profile for a dumpster floor;

FIG. 2 illustrates a crossectional view of a further exemplary embodiment of the inventive profile for a dumpster floor;

FIG. 3 illustrates a perspective view of a dumpster bridge or trough of the present invention;

FIG. 4 illustrates a perspective view in which an alternative embodiment of the inventive dumpster floor is shown.

DESCRIPTION OF THE PREFERRED EMBODIMENTS

FIG. 1 illustrates an exemplary embodiment of the inventive profile (referenced 1 overall) for a dumpster floor in cross-section. This design is of an H-shaped profile with a web 2 whose outer lateral surface 3 forms a part of the load surface of a dump vehicle in the assembled condition. Just like the profile 1, the web 2 comprises a cross-sectional area that is constant overall in longitudinal direction. During assembly, a plurality of profiles 1—whose plurality and respective length is to be matched to the dimensions of the dumpster floor—are arranged next to one another such that their generally outwardly directed lateral surfaces 3 align and form a planar load surface with one another. Alternatively, the profiles 1 for example, can also be arranged offset, so that a stepped load surface, i.e. a load surface comprising regular depressions, results.

During assembly, the profiles 1 are connected to one another by welding at their lateral or end surfaces 4 lying adjacent one another and proceeding transverse to the lateral surface 3, whereby other suitable joining methods such as, in particular, releasable joint types as well can be applied. For the H-shaped profile 1, neighboring profiles can be joined to one another by welding at the opposite, second web 5. When, alternatively, a U-shaped profile is utilized, then the transverse web connecting the two sidewalls of the u form lying opposite one another expediently forms the web 2 that comprises the outer lateral surface 3 forming a part of the load surface. Given a T-profile, the transverse web extending at both sides of the vertical web forms the web 2 comprising the lateral surface 3.

The profile 1 shown in FIG. 1 is only partially particle-reinforced. It is essentially comprised of aluminum and a region 6 reinforced with ceramic particles of $Al_2O_3$. The profile 1 is manufactured by co-extrusion of an aluminum wrought alloy and of a layer forming the particle-reinforced region 6. Alternatively, the wrought alloy can also be composed of a different light metal and the particles can be composed of a different (reinforcing) material such as, for example, SiC. The particle-reinforced region 6 lies directly at the lateral surface 3 of the web 2 forming the load surface of the dumpster floor. In the present case of a welded connection, the particle-reinforced region 6 does not extend into the region adjoining the end faces 4 of the web 2 in order to assure a stable welding process in the joining of neighboring profiles 1 for the formation of the floor that is not influenced by the reinforcing particles.

Whereas only the small region 6 adjoining the lateral surface 3 is reinforced with ceramic particles given the profile 1 shown in FIG. 1, this region can be expanded dependent on the application and, for example, can cover the entire web 2. Such a profile can also be economically manufactured in that an aluminum wrought alloy is co-extruded with a layer provided with ceramic particles. Alternatively, the layer comprising the ceramic particles can be applied to a non-reinforced light metal or, respectively, aluminum initial profile by schoopage or any other suitable method.

FIG. 2 shows another exemplary embodiment of the inventive profile 1 for the dumpster floor wherein it is not only the region 6 adjoining the lateral surface 3 of the web 2 but the entire profile I that is reinforced with ceramic particles. Such a material is homogeneous. It is composed of a light metal or, respectively, aluminum matrix reinforced with ceramic particles and is extruded for forming the profile 1.

In a highly simplified, perspective illustration, FIG. 3 shows a dumpster bridge or, respectively, trough with an embodiment of the inventive dumpster floor that is laid in longitudinal direction, i.e. generally in travel direction or, respectively, in the direction of the longest dimension of the dumpster floor. Compared to the transverse laying shown in FIG. 4 in a corresponding illustration, the longitudinal laying of the profiles 1 has the advantage that the number of required profiles 1 and the assembly outlay are lower. As a result of the particle-reinforced region 6 adjoining the lateral surface 3, the load surface 7 formed by the respective lateral surfaces 3 of the profiles 1 exhibits a significantly lower abrasive wear than those of the Prior Art.

It is advantageous given the transverse laying shown in FIG. 4 that, for cost reasons, only a back region 8 of the load surface of the dumpster floor most exposed to wear is potentially formed by particle-reinforced profiles 1, whereas a front region 9 is formed by non-reinforced profiles 1. Alternatively, for example, the back region 8 of the load surface 7 can also be formed with completely particle-reinforced profiles 1 and the front region 9 can be formed with partially particle-reinforced profiles 1.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A floor member comprising at least one profile having at least one web with a lateral surface adapted to face a load, and at least a region of the profile adjoining the lateral surface that is reinforced with ceramic particles, wherein the profile comprises light metal.

2. A floor member according to claim 1, wherein the light metal is aluminum.

3. A floor member according to claim 1, wherein a region of the profile adjoining opposite end surfaces of the web transverse to the lateral surface is not particle-reinforced.

4. A floor member according to claim 1, wherein no more than 15% of a cross-sectional area of the profile is particle-reinforced.

5. A floor member according to claim 1, wherein the profile is formed by co-extrusion.

6. A floor member according to claim 1, wherein a layer forming a particle-reinforced region is applied by schoopage.

7. A floor member according to claim 1, wherein the web is completely particle-reinforced.

8. A floor member according to claim 1, wherein the profile is completely particle-reinforced.

9. A floor member according to claim 1, wherein the profile is comprised of a homogeneous, particle-reinforced material having the region reinforced with ceramic particles and a matrix of the light metal.

10. A floor member according to claim 8 or 9, wherein the profile is formed by extrusion.

11. A floor member according claim 1, wherein the profile is an open profile.

12. A floor member according to claim 1, wherein the profile is an H-shaped profile and the web that comprises the lateral surface adapted to face toward the load is one of two opposite webs transverse to a connecting web.

13. A floor member according to claim 1, wherein the profile is a closed profile.

14. A load-bearing floor comprised of a plurality of profiles having long and short sides with the long sides arranged next to one another, each of said profiles respectively comprising a web with a lateral surface adapted to face toward a load, wherein a load surface is formed by the lateral surfaces and at least a region of the profiles adjoining the lateral surface is reinforced with ceramic particles.

15. A floor according to claim 14, wherein the profiles are releasably joined to one another.

16. A floor according to claim 14, wherein the profiles are rigidly connected to one another.

17. A floor according to claim 16, wherein adjacent profiles are longitudinally joined to one another by welding.

18. A floor according claim 14 wherein the profiles are arranged parallel to a longitudinal direction of the floor.

19. A floor according to claim 14 wherein the profiles are arranged transverse to a longitudinal direction of the floor and form a back region of the load surface, and a front region of the load surface is formed by non-reinforced profiles.

* * * * *